US010572969B2

(12) United States Patent
Ha

(10) Patent No.: US 10,572,969 B2
(45) Date of Patent: Feb. 25, 2020

(54) METHOD AND DEVICE FOR PROCESSING DATA

(71) Applicant: Samsung Electronics Co., Ltd., Suwon-si, Gyeonggi-do (KR)

(72) Inventor: Sang-won Ha, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 232 days.

(21) Appl. No.: 15/609,137

(22) Filed: May 31, 2017

(65) Prior Publication Data
US 2018/0137600 A1     May 17, 2018

(30) Foreign Application Priority Data

Nov. 17, 2016  (KR) .................. 10-2016-0153319

(51) Int. Cl.
*G06K 9/00* (2006.01)
*G06T 1/60* (2006.01)
*G06T 7/11* (2017.01)
*G06F 17/16* (2006.01)

(52) U.S. Cl.
CPC .............. *G06T 1/60* (2013.01); *G06F 17/16* (2013.01); *G06T 7/11* (2017.01); *G06T 2207/20021* (2013.01)

(58) Field of Classification Search
None
See application file for complete search history.

(56) References Cited

U.S. PATENT DOCUMENTS

| | | | |
|---|---|---|---|
| 4,636,991 A | 1/1987 | Flannagan et al. | |
| 6,507,676 B1 * | 1/2003 | Harrington | G06T 7/44 345/582 |
| 8,411,962 B1 | 4/2013 | Geiss et al. | |
| 8,860,715 B2 * | 10/2014 | Birkbeck | G06K 9/00986 345/419 |
| 9,014,483 B2 | 4/2015 | Ito et al. | |
| 9,021,347 B2 * | 4/2015 | Ito | G06K 9/00248 345/423 |

(Continued)

FOREIGN PATENT DOCUMENTS

| | | |
|---|---|---|
| JP | 5340088 B2 | 11/2013 |
| KR | 199100029 31 | 2/1991 |
| KR | 101431715 B1 | 8/2014 |

OTHER PUBLICATIONS

Optimal parallel algorithms for computing—models, Koji Nakano ResearchGate, Dec. 2013, pp. 1-10 (Year: 2013).*

(Continued)

*Primary Examiner* — Jayesh A Patel
(74) *Attorney, Agent, or Firm* — Harness, Dickey & Pierce, P.L.C.

(57) ABSTRACT

A method of processing data includes: generating at least one partial summed area table (SAT) by dividing data stored in a global memory, and obtaining a row sum and a column sum of each of the at least one partial SAT; performing propagation on the obtained row sums and column sums; when a process of utilizing the SAT is executed, completing at least a partial area of the SAT necessary for the process based on the at least one partial SAT, and the row sums and column sums on which the propagation has been performed; and performing the process by using the completed partial area.

15 Claims, 9 Drawing Sheets

(56) References Cited

U.S. PATENT DOCUMENTS

| | | | |
|---|---|---|---|
| 9,230,305 B2* | 1/2016 | Ziegler | G06T 5/003 |
| 9,235,769 B2 | 1/2016 | Oro Garcia et al. | |
| 9,398,297 B2* | 7/2016 | Gupta | H04N 19/103 |
| 9,760,966 B2* | 9/2017 | Savransky | G06T 1/20 |
| 2004/0218827 A1* | 11/2004 | Cohen | G06K 9/00248 |
| | | | 382/243 |
| 2009/0157707 A1* | 6/2009 | Ito | G06K 9/00973 |
| 2010/0180189 A1* | 7/2010 | Ito | G06K 9/00248 |
| | | | 715/219 |
| 2011/0058741 A1* | 3/2011 | Ito | G06K 9/00973 |
| | | | 382/173 |
| 2013/0089260 A1* | 4/2013 | Pires | G06K 9/4619 |
| | | | 382/190 |
| 2013/0236103 A1* | 9/2013 | Hashiguchi | G06K 9/38 |
| | | | 382/192 |
| 2013/0243329 A1* | 9/2013 | Oro García | G06K 9/00973 |
| | | | 382/195 |
| 2014/0185951 A1* | 7/2014 | Ziegler | G06T 5/003 |
| | | | 382/255 |
| 2015/0071561 A1* | 3/2015 | Hsieh | G06T 5/002 |
| | | | 382/264 |
| 2015/0125085 A1 | 5/2015 | Gupta | |
| 2016/0125263 A1 | 5/2016 | Sankaranarayanan et al. | |
| 2016/0171331 A1* | 6/2016 | Csefalvay | G06K 9/3241 |
| | | | 382/103 |
| 2017/0371838 A1* | 12/2017 | Kasagi | G06K 9/54 |
| 2018/0007302 A1* | 1/2018 | Meixner | G06F 17/16 |

OTHER PUBLICATIONS

Integral Images—Systems, Shoaib Ehsan et al., Sensors 2015, Jul. 2015, pp. 16804-16822 (Year: 2015).*

GPU-Efficient Recursive filtering—Tables, Diego Nehab et al., ACM, 2011, pp. 176-1 to 176-11 (Year: 2011).*

Harris, Mark, "Parallel Prefix Sum (Scan) with CUDA," Nvidia, Apr. 2007, pp. 1-18.

Ha, Sang-Won et al., "Bandwidth Efficient Summed Area Table Genaration for CUDA," Journal of Korea Game Society, Oct. 2012, vol. 12, No. 5, pp. 67-77.

Nehab, Diego et al., "GPU-Efficient Recursive Filtering and Summed-Area Tables," IMPA—Microsoft Research, pp. 1-11.

Ehsan, Shoaib et al., "Integral Images: Efficient Algorithms for Their Computation and Storage in Resource-Constrained Embedded Vision Systems," Sensors, 2005, vol. 15, pp. 16804-16830.

* cited by examiner

FIG. 5

| | | | | | | | |
|---|---|---|---|---|---|---|---|
| 0 | 3 | 5 | 2 | 6 | 1 | 2 | 0 |
| 1 | 4 | 1 | 2 | 0 | 7 | 2 | 4 |
| 6 | 3 | 4 | 4 | 1 | 7 | 0 | 3 |
| 5 | 2 | 1 | 7 | 2 | 0 | 4 | 2 |
| 3 | 6 | 5 | 8 | 5 | 8 | 1 | 7 |
| 2 | 3 | 3 | 4 | 7 | 2 | 2 | 3 |
| 7 | 4 | 7 | 0 | 2 | 8 | 7 | 4 |
| 2 | 8 | 1 | 0 | 4 | 0 | 6 | 8 |

| | | | |
|---|---|---|---|
| 0 | 3 | 5 | 2 |
| 1 | 4 | 1 | 2 |
| 6 | 3 | 4 | 4 |
| 5 | 2 | 1 | 7 |

520

| | | | |
|---|---|---|---|
| 6 | 1 | 2 | 0 |
| 0 | 7 | 2 | 4 |
| 1 | 7 | 0 | 3 |
| 2 | 0 | 4 | 2 |

530

| | | | |
|---|---|---|---|
| 3 | 6 | 5 | 8 |
| 2 | 3 | 3 | 4 |
| 7 | 4 | 7 | 0 |
| 2 | 8 | 1 | 0 |

540

| | | | |
|---|---|---|---|
| 5 | 8 | 1 | 7 |
| 7 | 2 | 2 | 3 |
| 2 | 8 | 7 | 4 |
| 4 | 0 | 6 | 8 |

FIG. 7A

| 0 | 3 | 5 | 2 |
|---|---|---|---|
| 1 | 4 | 1 | 2 |
| 6 | 3 | 4 | 4 |
| 5 | 2 | 1 | 7 |

| 0 | 3 | 8 | 10 |
|---|---|---|----|
| 1 | 5 | 6 | 8  |
| 6 | 9 | 13| 17 |
| 5 | 7 | 8 | 15 |

| 12 | 12 | 11 | 15 |
|----|----|----|----|
| 12 | 9  | 6  | 13 |
| 11 | 5  | 5  | 11 |
| 5  | 2  | 1  | 7  |

FIG. 7D

| 12 | 24 | 35 | 50 |
|----|----|----|----|
| 12 | 21 | 27 | 40 |
| 11 | 16 | 21 | 32 |
| 5  | 7  | 8  | 15 |

METHOD AND DEVICE FOR PROCESSING DATA

CROSS-REFERENCE TO RELATED APPLICATION

This U.S. non-provisional application claims the benefit of priority under 35 U.S.C. § 119 to Korean Patent Application No. 10-2016-0153319, filed on Nov. 17, 2016, in the Korean Intellectual Property Office (KIPO), the disclosure of which is incorporated herein in its entirety by reference.

BACKGROUND

1. Field

Various example embodiments relate to methods, systems, devices, and/or non-transitory media for processing data.

2. Description of the Related Art

A summed area table (SAT) is a data structure for efficiently using data. The SAT is the sum of the value from all of the data elements between an origin point of a data matrix, e.g., for a two-dimensional (2D) matrix it would be (0,0) and a pivot data element (e.g., 5,5) of the input data. Generally, the SAT is used in image processing-related technology, and is used for image blur, filtering, and the like. The SAT may be for a 2D matrix, a 3D matrix, etc.

The SAT is generated using input data stored in a global memory. In this process, a data processing device needs to access the global memory several times in order to use the input data. In more detail, the input data stored in the global memory needs to be read and written several times. Since accessing and using global memory takes a lot of time, processing cycles, etc., the smaller the number of accesses and the access area, the faster the processing speed.

SUMMARY

Provided are methods, systems, devices, and/or non-transitory computer readable media for processing data capable of increasing the processing speed when generating and using a summed area table (SAT).

Additional aspects will be set forth in part in the description which follows and, in part, will be apparent from the description, or may be learned by practice of at least one example embodiment.

According to an aspect of at least one example embodiment, a method of processing data using a summed area table (SAT) includes generating, using at least one processor, at least one partial SAT, the generating including dividing data stored in a global memory into a plurality of divided data blocks, and obtaining an obtained row sum of each row and an obtained column sum of each column of at least one divided data block, performing propagation, using the at least one processor, on the obtained row sums and the obtained column sums, when a process of utilizing the SAT is executed, completing, using the at least one processor, at least one partial area of the SAT based on the at least one partial SAT and the obtained row sums and the obtained column sums on which the propagation has been performed, to create completed at least one partial SAT, and performing the process using the completed at least one partial area of the SAT.

According to an aspect of at least one example embodiment, a data processing device for using a summed area table (SAT) includes a plurality of processor cores, a global memory connected to the plurality of cores, and a controller configured to performing the process using the completed at least one partial area of the SAT, obtain an obtained row sum of each row and an obtained column sum of each column of the at least one partial SAT, perform propagation on the obtained row sums and the obtained column sums when a process of utilizing the SAT is executed, complete at least one partial area of the SAT based on the at least one partial SAT and the obtained row sums and the obtained column sums on which the propagation has been performed, to create completed at least one partial area of the SAT, and complete at least one partial area of the SAT based on the at least one partial SAT and the obtained row sums and the obtained column sums on which the propagation has been performed, to create completed at least one partial area of the SAT According to an aspect of at least one example embodiment, a method of processing image data using a summed area table (SAT) includes determining, using at least one controller, a number of processors included in a data processing device, dividing, using the at least one controller, an input image data set into a plurality of sub-data blocks based on the number of processors, the input image data set and the sub-data blocks being in a matrix format, generating, using the at least one controller, a plurality of partial SATs based on the plurality of sub-data blocks, generating, using the at least one controller, a plurality of partial SATs based on the plurality of sub-data blocks, and controlling, using the at least one controller, each of the plurality of processors to process the plurality of partial SATs in accordance with a desired image processing function in parallel.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 5 is a view of original data stored in a global memory according to at least one example embodiment;

FIG. 6 is a view illustrating a process of representing a divided data block according to at least one example embodiment;

FIGS. 7A through 7D are views illustrating a method of generating a partial summed area table (SAT) for one data block, according to at least one example embodiment;

DETAILED DESCRIPTION

Figure 1:
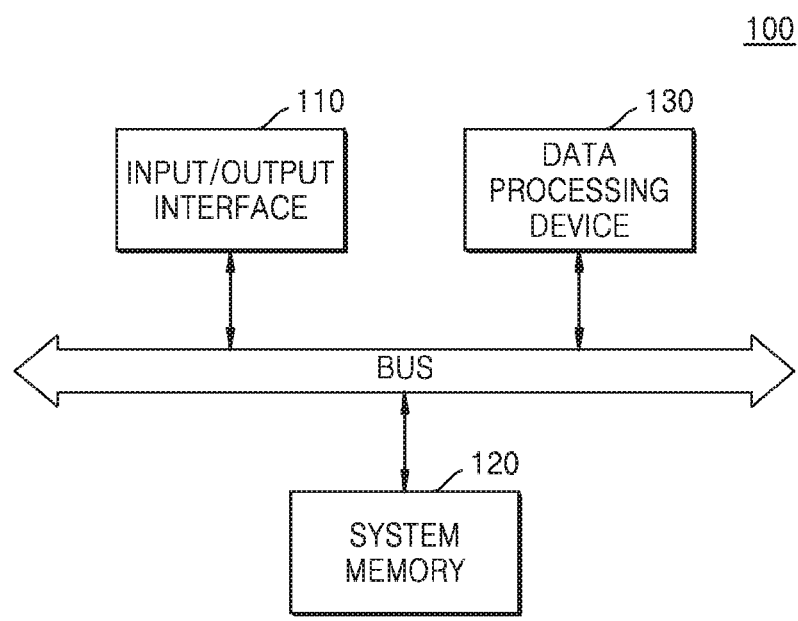
FIG. 1 is a view of an electronic system including a data processing device, according to at least one example embodiment.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when a region is referred to as being "connected to" or "coupled to" another region, it may be directly connected or coupled to the other region or intervening regions may be present. Furthermore, it will be understood that the terms "comprise", "include", and "have", when used herein, specify the presence of stated elements, but do not preclude the presence or addition of other elements, unless otherwise defined.

FIG. 1 is a view of an electronic system 100 including a data processing device, according to at least one example embodiment.

Referring to FIG. 1, the electronic system 100 including a data processing device according to at least one example embodiment may include an input/output interface 110, a system memory 120, and a data processing device 130, etc., but is not limited thereto. For example, the electronic system 100 may further include additional components and/or two or more components illustrated may be combined into a single component. For example, the electronic system 100 may further include a communication interface, a sensor, and the like. Furthermore, in at least one example embodiment, the electronic system 100 may include a user terminal such as a personal computer (PC), a laptop computer, a smart phone, a tablet PC, a gaming console, an Internet of Things (IoT) device, a home automation device, an artificial intelligence personal assistant system, a virtual reality (VR) and/or augmented reality (AR) device, or the like, capable of data processing, and a high-performance computer such as a server, a workstation, and so on.

The input/output interface 110 may include an input interface for receiving an input for data processing, and an output interface for outputting information such as a data processing result or a state of the electronic system 100. In at least one example embodiment, the input/output interface 110 may be a device that receives input data to be processed by the data processing device 130. For example, the input/output interface 110 may be a device such as a communication interface for receiving data from an external device, such as data received over a wired and/or wireless network, etc., and/or a sensor for obtaining data directly, etc.

The system memory 120 may store an operating system (OS), various programs including computer readable instructions, and data related to driving the electronic system 100. In at least one example embodiment, data input via the input/output interface 110 and stored in the system memory 120 may be provided to the data processing device 130.

The data processing device 130 receives data stored in the system memory 120 and processes the data. For example, the data processing device 130 may be a processing device that controls the entire electronic system 100, such as one or more processors (e.g., a central processing unit (CPU)), and/or may be a processing device having a specific function, such as a digital signal processing device (DSP), a graphics processing unit (GPU), etc. Each of the one or more processors of the data processing device 130 may include at least one processor core. The data processing device 130 may process data by receiving and calculating data according to a corresponding function, and outputting the calculated data. In at least one example embodiment, the data processing device 130 may be a processing device capable of parallel data processing, distributed data processing, networked data processing, cloud data processing, etc. In more detail, the data processing device 130 may include a parallel processing operator, but is not limited thereto.

The input/output interface 110, the system memory 120, and the data processing device 130 are communicatively connected to a bus BUS. The bus may transport instructions and/or data between the input/output interface 110, the system memory 120, and/or the data processing device 130, but the example embodiments are not limited thereto.

Figure 2:
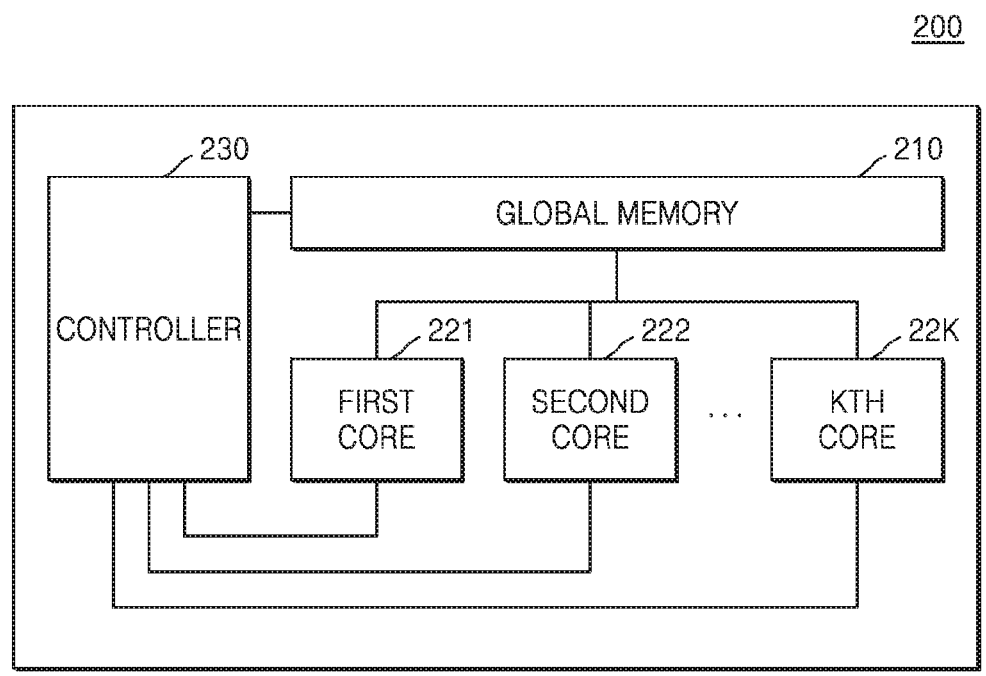
FIG. 2 is a block diagram illustrating an internal configuration of a data processing device according to at least one example embodiment.

FIG. 2 is a block diagram illustrating an internal configuration of a data processing device 200 according to at least one example embodiment.

Referring to FIG. 2, the data processing device 200 may include a global memory 210, a plurality of cores 221, 222, . . . , and 22K, and a controller 230, etc., (wherein K is an integer), but the example embodiments are not limited thereto. For example, the data processing device 200 may include additional components and/or two or more components illustrated may be combined into a single component.

The global memory 210 is a memory accessible by the plurality of cores 221, 222, . . . , and 22K, the controller 230, etc. The global memory 210 stores data read from the system memory 120 and/or stores data processed by the plurality of cores 221, 222, . . . , and 22K. Also, the global memory 210 outputs the stored data to the system memory 120 and/or the plurality of cores 221, 222, . . . , and 22K.

In at least one example embodiment, the global memory 210 may store input data, such as one or more input images. Also, the global memory 210 may store a partial summed area table (SAT), a row sum, a column sum, a pivot value generated by the plurality of cores 221, 222, . . . , and 22K, etc. Furthermore, when each of the cores performs propagation on the row sum and the column sum of the SAT, the global memory 210 may store the row sum and the column sum on which the propagation has been performed.

The plurality of cores 221, 222, . . . , and 22K read and process data. In at least one example embodiment, the data processing device 200 may read data from the global memory 210, process the data, and store the result in the global memory 210 again. In addition, the data processing device 200 may perform parallel data processing using the plurality of cores 221, 222, ..., and 22K, but is not limited thereto. For example, the plurality of cores may process data serially and/or independently. In at least one example embodiment, each of the cores may process a plurality of threads. This will be described in detail with reference to FIG. 3.

Figure 3:
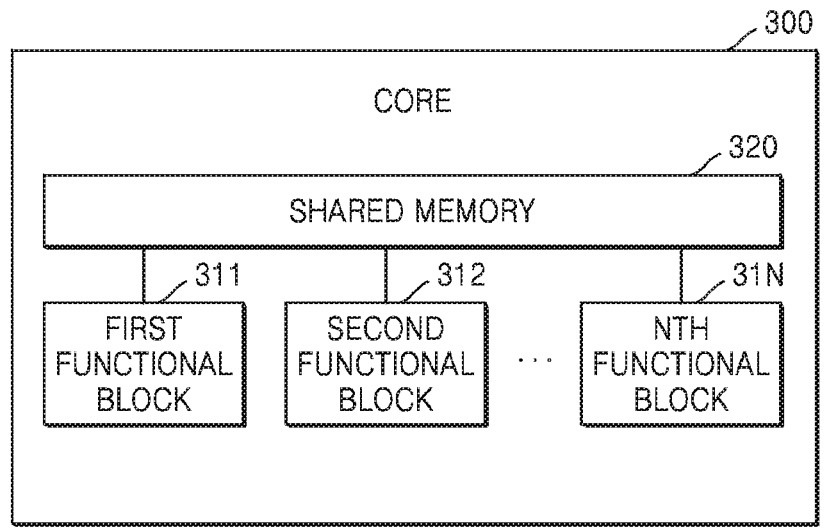
FIG. 3 is a block diagram illustrating an internal configuration of a core according to at least one example embodiment.

FIG. 3 is a block diagram illustrating an internal configuration of a core according to at least one example embodiment.

Referring to FIG. 3, a core 300 of at least one data processing device 200 may include a plurality of functional blocks 311, 312, ..., and 31N for respectively processing threads and a shared memory 320 to which the plurality of functional blocks 311, 312, ..., and 31N are accessible according to at least one example embodiment, but is not limited thereto.

The plurality of functional blocks 311, 312, ..., and 31N process actual computations. In at least one example embodiment, the plurality of functional blocks 311, 312, ..., and 31N may each process threads, respectively. In other words, the plurality of functional blocks 311, 312, ..., and 31N may support a multi-thread function collectively according to at least one example embodiment, but the example embodiments are not limited thereto. Furthermore, the plurality of functional blocks 311, 312, ..., and 31N may process data stored in the shared memory 320 in parallel. In at least one example embodiment, the plurality of functional blocks 311, 312, ..., and 31N may include an adder logic circuit.

The plurality of functional blocks 311, 312, ..., and 31N process the data stored in the shared memory 320 and store the processing results back in the shared memory 320. Additionally, the processing result values and/or other data that are stored in the shared memory 320 may be stored in the global memory 210 again. Since only a corresponding core 300 may access the shared memory 320 (e.g., the shared memory 320 is included in the corresponding core 300), in order to process data with the other cores in parallel, processing results need to be stored in the global memory 210, which all of the cores can access.

Referring again to FIG. 2, the controller 230 controls all operations regarding data processing of the data processing device 200 including the global memory 210 and the plurality of cores 221, 222, ..., and 22K, but is not limited thereto.

The controller 230 divides the data (e.g., image data, etc.) stored in the global memory 210 to generate at least one partial SAT, and further obtains a row sum and a column sum of each of the at least one partial SAT. In addition, the controller 230 performs propagation on the obtained row sums and column sums. Furthermore, when the process utilizing a SAT is executed, the controller 230 controls the plurality of cores 221, 222, ..., and 22K and the global memory 210 to complete at least a partial area of the SAT (e.g., a region of the full SAT) desired and/or necessary for the process (e.g., image processing function) based on the at least one partial SAT and the row sums and column sums on which the propagation has been performed, and perform the process using the completed partial area.

In at least one example embodiment, the controller 230 may store a data block in the shared memory 320 of each of the plurality of cores 221, 222, ..., and 22K. In addition, the controller 230 may control the plurality of cores 221, 222, ..., and 22K and the global memory 210 to perform a prefix sum operation in a horizontal direction for each row of the SAT and/or matrix associated with the stored data (e.g., the image data to be processed, etc.) and a prefix sum operation in a vertical direction for each column of the SAT and/or matrix associated with the stored data (e.g., the image data to be processed, etc.) by using the plurality of functional blocks 311, 312, ..., and 31N for the data block stored in the shared memory 320, and to store the results in the global memory 210. A prefix sum operation may be an addition operation that calculates the running total of a series of inputs (e.g., if the inputs of a prefix sum operation are X=1, 2, 3, 4, 5, etc., the output is Y=1, 3, 6, 10, 15, etc.).

In at least one example embodiment, the controller 230 may store obtained row sums and column sums (e.g., the results of the prefix sum operations in the vertical and horizontal directions) read from the global memory 210 in the shared memory 320 of each of the plurality of cores 221, 222, ..., and 22K. The controller 230 may perform a prefix sum operation in a horizontal direction of the SAT and/or matrix associated with the stored data using the plurality of functional blocks 311, 312, ..., and 31N for the obtained row sum stored in the shared memory 320, and may perform a prefix sum operation in a vertical direction of the SAT and/or matrix associated with the stored data for the obtained column sum. In addition, the controller 230 may control the plurality of cores 221, 222, ..., and 22K and the global memory 210 to perform propagation based on the row sum on which the prefix sum operation has been performed in a horizontal direction of a data matrix and the column sum on which the prefix sum operation has been performed in a vertical direction of a data matrix, and store the propagation result in the global memory 210.

In at least one example embodiment, the controller 230 may perform a prefix sum operation in horizontal and vertical directions for pivot values (e.g., entry value) of at least one partial SAT. A pivot value may be a data element of a matrix that is selected for the SAT or the partial SAT calculation. For example, the pivot value may be the data element designated to act as a counter position to the origin point from which the SAT and/or the partial SAT is defined as a rectangular bounding box. If the point 5,5 is selected as the pivot value, then the sides of the SAT will be defined with corners at the origin point (e.g., 0,0), a first corner (e.g., 0,5), a second corner (5,0), and the pivot value (5,5). The controller 230 may perform a prefix sum operation in a vertical direction for each partial SAT for row sums on which a prefix sum operation has been performed in a horizontal direction, and may perform a prefix sum operation in a horizontal direction for each partial SAT for column sums on which a prefix sum operation has been performed in a vertical direction. The partial SAT may be a subset of the full SAT, for example, if the pivot value of the full SAT is (5,5), the partial SAT's pivot value may be (0, 3), (4, 1), etc., i.e., some pivot value that is smaller than (e.g., included within) the pivot value of the full SAT. Furthermore, the controller 230 may control at least one core to apply pivot values to the row sums on which a prefix sum operation has been performed in a vertical direction, and the column sums on which a prefix sum operation has been performed in a horizontal direction and may calculate the accumulated row sums and column sums, and store the results in the global memory 210.

In at least one example embodiment, the controller 230 may store a partial SAT including necessary data read from the global memory 210, and a row sum, a column sum and a pivot value on which propagation has been performed, in the shared memory 320 of each of at least one of the plurality of cores 221, 222, ..., and 22K. Also, the controller 230 may control at least one core using a plurality of functional blocks to complete a partial area based on the partial SAT including the necessary data, the row sum, the column sum and the pivot value on which propagation has been performed.

According to at least one example embodiment, the data processing device 200 may store a partial SAT instead of a completed SAT, a row sum, a column sum and/or a pivot value in the global memory 210, and may use them in combination when needed. As a result, the data processing device 200 may reduce the number of memory accesses and decrease the operation time (e.g., processing time) with respect to the global memory 210 having a slower processing speed (e.g., the latency of the global memory 210 may have a latency speed that is orders of magnitude higher than the latency of the shared memory 320), thereby increasing the overall processing speed of the SAT.

The operation of the data processing device 200 according to at least one example embodiment has been described. A method of processing data according to some example embodiments will be described in more detail later below.

Figure 4:
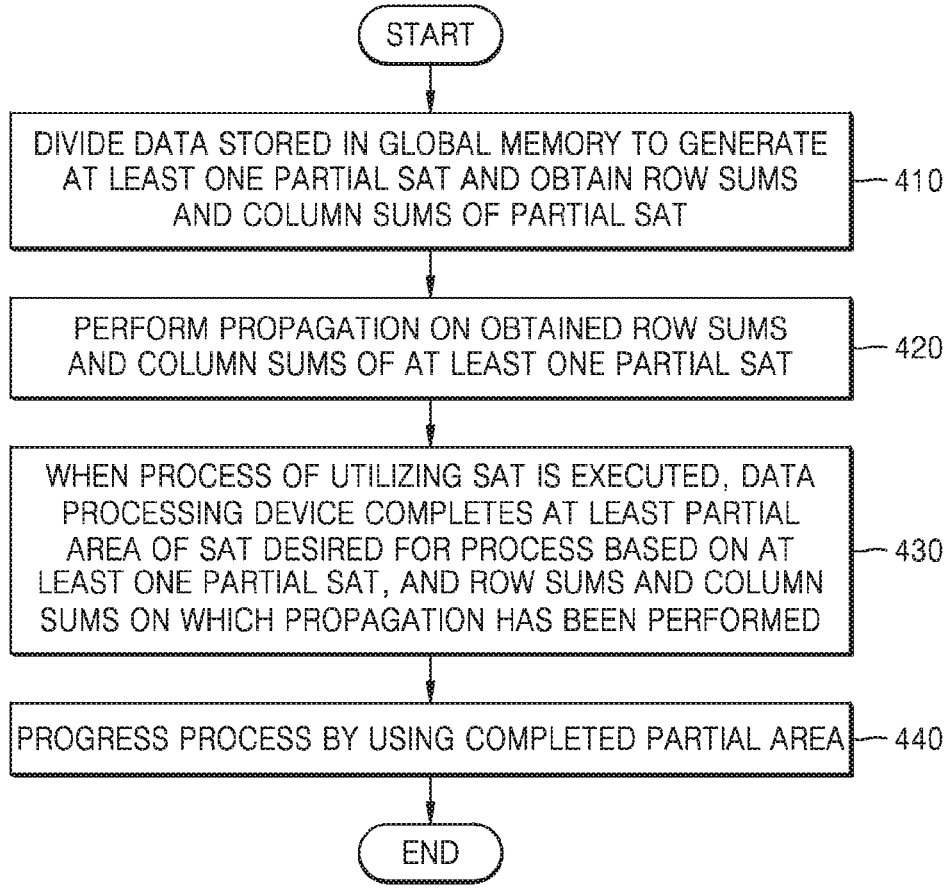
FIG. 4 is a flowchart of a method of processing data, according to at least one example embodiment.

FIG. 4 is a flowchart of a method of processing data, according to at least one example embodiment.

In operation 410, the data processing device 200 divides data (e.g., image data, etc.) related to a data matrix to be processed that is stored in a global memory to generate a partial SAT and obtains a row sum and a column sum of the partial SAT.

In at least one example embodiment, the data processing device 200 may divide data stored in the global memory 210 and allocate the divided data to the plurality of cores 221, 222, . . . , and 22K to generate a partial SAT. This will be described with reference to FIGS. 5 and 6.

FIG. 5 is a view of original data stored in a global memory according to at least one example embodiment.

Referring to FIG. 5, original data is an 8×8 data block 500 wherein each of the data blocks has a value, but the example embodiments are not limited thereto. The original data of FIG. 5 is only an example, and the original data may have various shapes (e.g., matrix shapes) and sizes (e.g., matrix sizes).

FIG. 6 is a view illustrating a process of representing a divided data block according to at least one example embodiment.

Referring to FIG. 6, it can be seen that the original data of FIG. 5 is divided into four 4×4 data blocks 510, 520, 530, and 540. The desired type and/or the desired size of each of the data block to be divided (e.g., sub-data blocks) may also be variously selected. However, it may be desirable to divide the data block to have the same shape and size for faster data processing, but the example embodiments are not limited thereto.

The divided data block is allocated to the plurality of cores 221, 222, . . . , 22K included in the data processing device 200 to generate a partial SAT table. According to at least one example embodiment, allocating one data block to one core may further benefit parallel data processing. Therefore, the size of a data block to be divided may be determined in consideration of (and/or based on) the number of cores. For example, when the data processing device 220 has n cores, data may be divided by a multiple of n.

However, this is only an example, and it is also possible to divide original data into an appropriate number of data blocks. For example, it is possible to divide a data block into a number smaller than the number of cores, a number greater than the number of cores, etc.

Referring again to FIG. 4, in at least one example embodiment, a core allocated with block data by the data processing device 200 may generate a partial SAT by performing a prefix sum operation in a horizontal direction for each row in a data block, and performing a prefix sum operation in a vertical direction for each column. In the process of generating the partial SAT, a row sum and a column sum of the partial SAT may be obtained. This will be described with reference to FIGS. 7 through 9.

Figure 8:
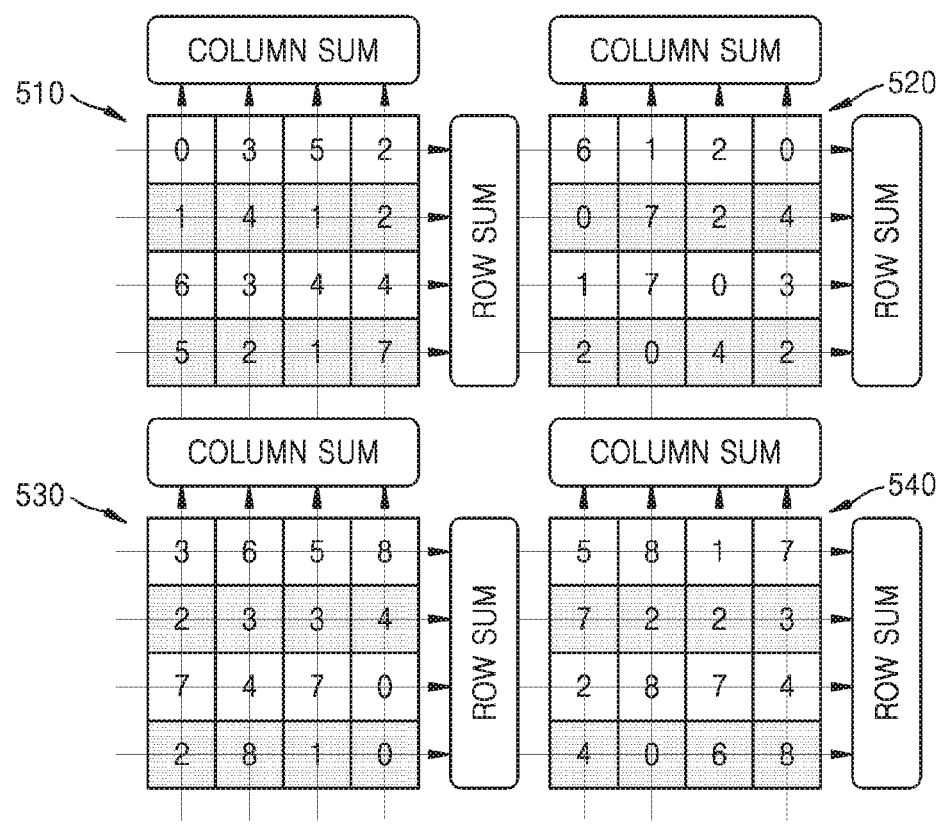
FIG. 8 is a view illustrating a method of generating a partial SAT for all data, according to at least one example embodiment.

FIGS. 7A through 7D are views illustrating a method of generating a partial SAT for one data block, according to at least one example embodiment, and FIG. 8 is a view illustrating a method of generating a partial SAT for all data, according to at least one example embodiment.

FIG. 7A illustrates a data block 510 (e.g., a sub-data block) obtained by dividing the original data.

FIG. 7B is a view illustrating a result 511 (e.g., an incomplete and/or intermediate partial data SAT) which depicts the results of performing a prefix sum operation in a horizontal direction for each row of the data block 510 (e.g., performing a horizontal prefix sum operation). Referring to FIG. 7B, it is possible to obtain a value accumulated in a direction in which, for example, the x-coordinate of a 2D matrix (which the example embodiments are not limited to), of each of the rows increases. As a result, if a prefix sum operation is performed in a horizontal direction for each row (e.g., a horizontal prefix sum operation), row sums 511 may be obtained easily, or in other words the values in the column 511 will include the sums of each of the rows of the data block 510. The prefix sum operation may be performed in any direction (e.g., X direction, Y direction, Z direction, etc.). In addition, when parallel processing is performed on a data block, prefix sum operations in each direction of the matrix, e.g., a horizontal direction and a vertical direction, etc., may be performed simultaneously and/or in parallel.

FIG. 7C is a view illustrating a result 512 (e.g., an incomplete and/or intermediate partial data SAT) of performing a prefix sum operation in a vertical direction for each column of the data block 510 (e.g., performing a vertical prefix sum operation). Referring to FIG. 7C, it is possible to obtain a value accumulated in the direction in which the y-coordinate of each of the columns increases. As a result, if a prefix sum operation is performed in a vertical direction for each column, column sums 512 may be obtained easily.

FIG. 7D is a view of a completed partial SAT according to at least one example embodiment.

The partial SAT may be generated based on the results of the prefix sum operation for each row and each column, for example as shown in FIGS. 7B and 7C. In at least one example embodiment, a process of calculating each of the row sums and the column sums performed in FIGS. 7B and 7C may be performed at the same time (e.g., simultaneously and/or in parallel), or one of the row sums or the column sums may be calculated first (e.g., a prefix sum operation is performed on each dimension of the sub-data block sequentially) and then the remaining values may be calculated.

Referring to FIG. 8, according to at least one example embodiment, a partial SAT may be generated for each of the four 4×4 divided data blocks 510, 520, 530, and 540, and row sums and column sums may be obtained in the process.

In at least one example embodiment, when a partial SAT is generated, the processing speed may be increased through data parallel processing. For example, when the data processing device 200 includes four cores and divides and allocates the four data blocks 510, 520, 530, and 540, to the four cores for processing, at the same time (e.g., in parallel), the processing speed may be faster than when the divided data blocks 510, 520, 530, and 540 are sequentially processed.

Figure 9:
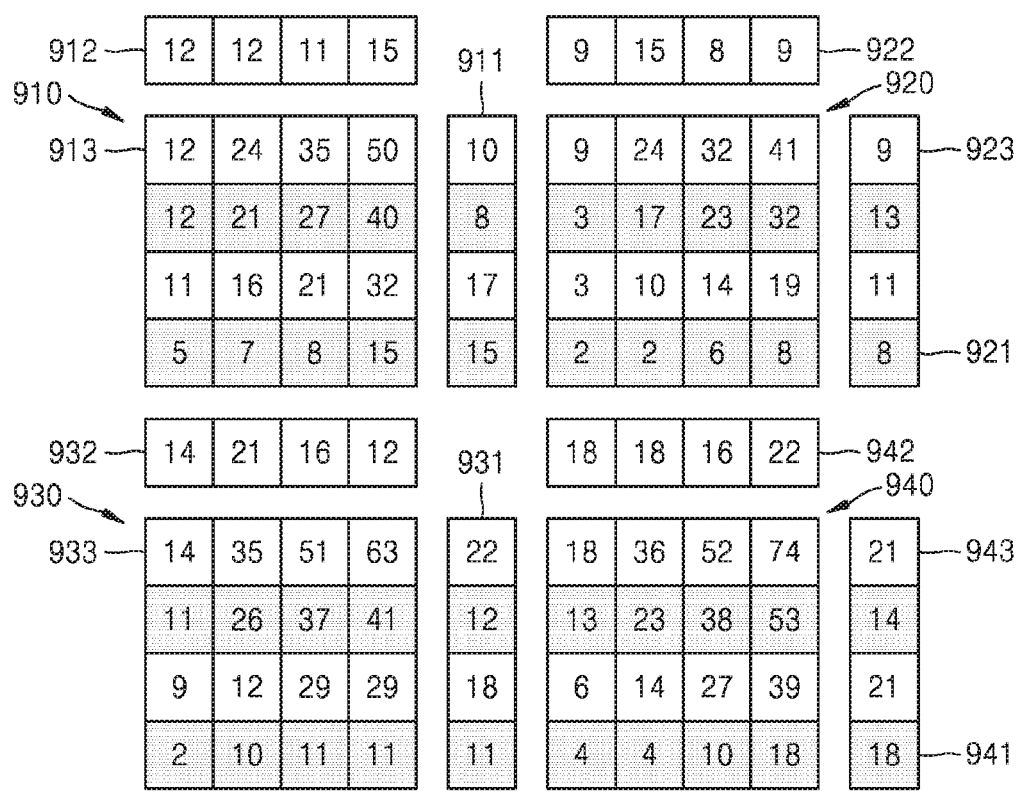
FIG. 9 is a view of partial SATs, row sums, column sums, and pivot values generated according to at least one example embodiment.

FIG. 9 is a view of partial SATs, row sums, column sums, and pivot values generated according to at least one example embodiment.

FIG. 9 shows partial SATs 910, 920, 930, and 940 generated based on the divided four 4∴4 data blocks 510, 520, 530, and 540. Furthermore, FIG. 9 shows row sums 911, 921, 931 and 941, and column sums 912, 922, 932, and 942 for each of the data blocks 510, 520, 530 and 540 obtained in the process of generating the partial SATs 910, 920, 930 and 940.

Each core is allocated with a data block and generates partial SATs for the allocated data block, obtains row sums and column sums based on the allocated data block, and stores the sums in a shared memory. The data processing device 200 may control the core such that each of the partial SATs, and the row sums and the column sums stored in the shared memory, are copied and stored in the global memory 210 of the data processing device 200.

Referring again to FIG. 4, in operation 420, the data processing device 200 performs propagation on a row sum and a column sum of a partial SAT. The propagation is a process of calculating an accumulated value of the row sum and the column sum of each partial SAT. In operation 410, the total data is divided and a row sum and a column sum are calculated for each of the divided data blocks. Therefore, individual values are accumulated to complete a SAT in the future.

In at least one example embodiment, the data processing device 200 performs a prefix sum operation in a horizontal direction on obtained row sums, and performs a prefix sum operation in a vertical direction on obtained column sums. Next, the data processing device 200 may perform propagation based on the row sums on which the prefix sum operation has been performed in a horizontal direction, and the column sums on which the prefix sum operation has been performed in a vertical direction.

In at least one example embodiment, when performing the propagation, the data processing device 200 performs a prefix sum operation in a horizontal direction and a vertical direction for pivot values of at least one partial SAT. The pivot value indicates a value of data located at a position (e.g., the value of a cell of a matrix) that is the farthest from and symmetric to the origin and may be used as a position to draw the boundary of the data matrix.

Next, the data processing device 200 performs a prefix sum operation in a vertical direction for each partial SAT for row sums on which a prefix sum operation has been performed in a horizontal direction. Additionally, the data processing device 200 performs a prefix sum operation in a horizontal direction for each partial SAT for column sums on which a prefix sum operation has been performed in a vertical direction. Furthermore, the data processing device 200 may apply pivot values to row sums on which a prefix sum operation has been performed in a vertical direction and column sums on which a prefix sum operation has been performed in a horizontal direction, and may calculate the accumulated row sums and column sums. This will be described with reference to FIGS. 10 and 11.

Figure 10:
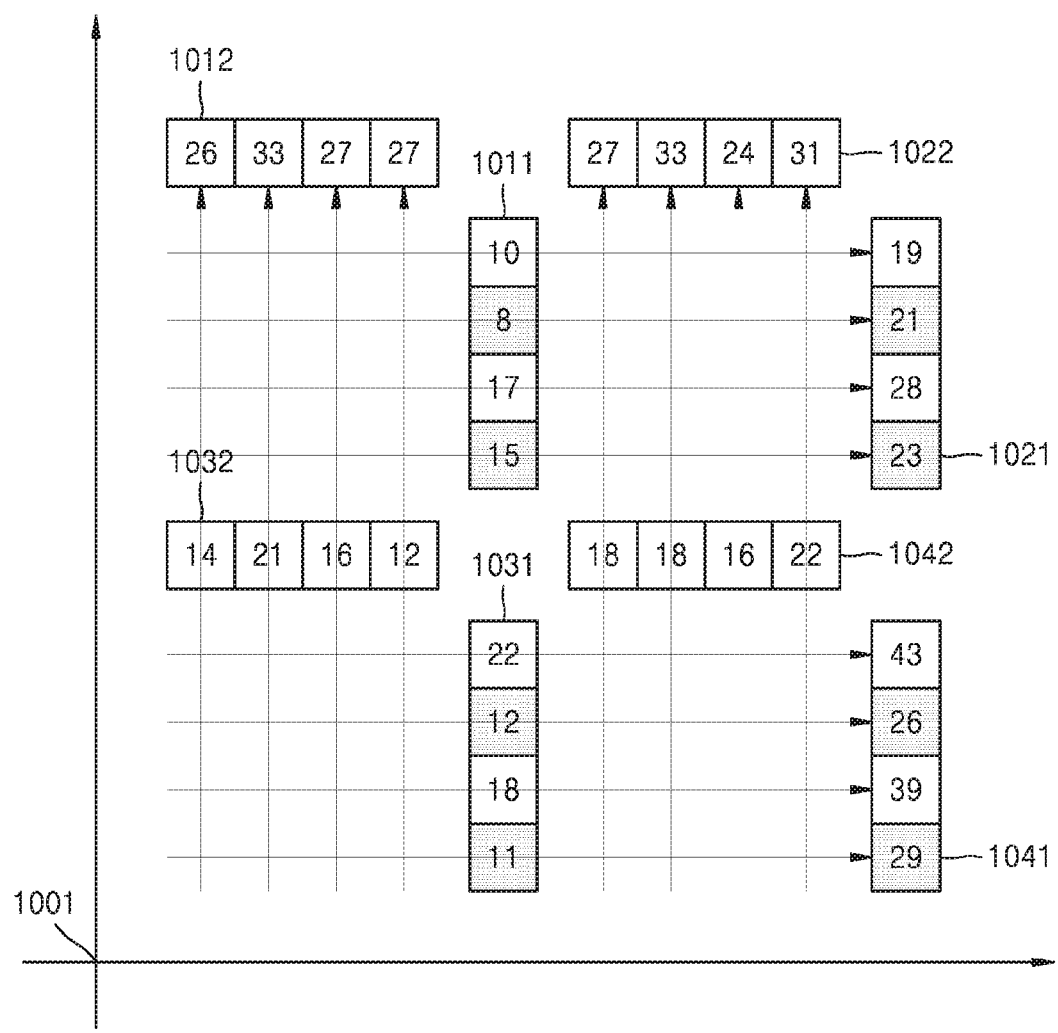
FIG. 10 is a view illustrating a process of performing a prefix sum operation on obtained row sums and column sums according to at least one example embodiment.

FIG. 10 is a view illustrating a process of performing a prefix sum operation on obtained row sums and column sums according to at least one example embodiment.

Referring to FIG. 10 and FIG. 8, row sums and column sums are accumulated in a direction away from the origin 1001. In more detail, the data block 530 among the data blocks 510, 520, 530, and 540 divided in operation 410 is a data block adjacent to the origin. Thus, an accumulated row sum 1031 and a column sum 1032 of the data block 530 are the same as the row sum 931 and column sum 932 of the data block 530 according to this example embodiment, but the example embodiments are not limited thereto.

The data block 510 is a data block adjacent in a y-axis direction (e.g., above or below in the original data block/original data matrix) from the data block 530, but the example embodiments are not limited thereto. Thus, an accumulated row sum 1011 of the data block 510 is equal to the row sum 911 of the data block 510 of FIG. 6. However, an accumulated column sum 1012 of the data block 510 should consider the accumulated column sum 1032 of the data block 530 (e.g., the accumulated column sum of any earlier sub-data block should be considered when performing the accumulated column sum of the later sub-data block). Therefore, the accumulated column sum 1012 of the data block 510 may be calculated by adding the column sum 912 of the data block 510 to the accumulated column sum 1032 of the data block 530. In other words, the accumulated column sum 1032 holds a running total of the column sums The data block 540 is a data block adjacent in an x-axis direction from the data block 530 (e.g., to the left or right in the original data block/original data matrix). Thus, an accumulated column sum 1042 of the data block 540 is equal to the column sum 942 of the data block 540. However, an accumulated row sum 1041 of the data block 540 should consider the accumulated row sum 1031 of the data block 530 (e.g., the accumulated row sum of any earlier sub-data block should be considered when performing the accumulated row sum of the later sub-data block). Therefore, the accumulated row sum 1041 of the data block 540 may be calculated by adding the row sum 941 of the data block 540 to the accumulated row sum 1031 of the data block 530.

Lastly, the data block 520 is a data block adjacent to the data block 540 in a y-axis direction and adjacent to the data block 510 in an x-axis direction according to the example illustrated in FIG. 8, but the example embodiments are not limited thereto. Therefore, the accumulated row sum 1021 of the data block 520 may be calculated by adding the row sum 921 of the data block 520 to the accumulated row sum 1011 of the data block 510. Therefore, the accumulated column sum 1022 of the data block 520 may be calculated by adding the column sum 922 of the data block 520 to the accumulated column sum 1042 of the data block 540.

In at least one example embodiment, when performing prefix sum operations for row sums and column sums, a prefix sum operation for row sums may be performed first, a prefix sum operation for column sums may be performed first, or both the prefix sum operations may be performed at the same time, but the example embodiments are not limited thereto and the original data block may include three or more dimensions.

Figure 11:
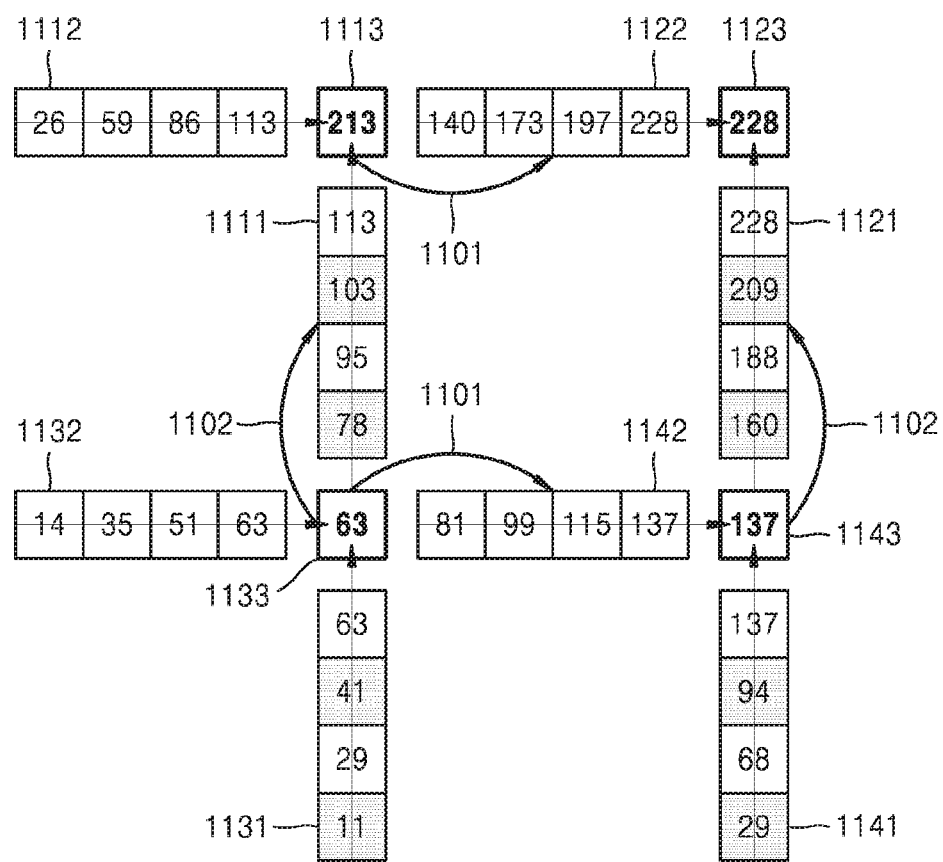
FIG. 11 is a view illustrating a process of performing a prefix sum operation on an intermediate value, and row sums and column sums on which a prefix sum operation is performed, according to at least one example embodiment.

FIG. 11 is a view illustrating a process of performing a prefix sum operation on an intermediate value, and row sums and column sums on which a prefix sum operation is performed according to at least one example embodiment.

The data processing device 200 may perform a prefix sum operation in a horizontal direction and a vertical direction for a pivot value of each of the partial SATs 910, 920, 930, and 940. Pivot values 1113, 1123, 1133, and 1143, on which the prefix sum operation has been performed, are used as median values in a propagation process.

Referring to FIG. 11, the pivot values are accumulated in the direction away from the origin 1001. While various example embodiments have been described wherein the direction away from the origin have been up and to the right of the origin, the example embodiments are not limited thereto and other directions away from the origin may be used, for example, down and to the left, etc. In more detail, the data block 530 among the data blocks 510, 520, 530, and 540 divided in operation 410 is a data block adjacent to the origin 1001. Thus, the accumulated pivot value 1133 of the data block 530 is equal to a pivot value 933 of the data block 530.

The data block 510 is a data block adjacent in a y-axis direction to the data block 530. Therefore, the accumulated pivot value 1113 of the data block 510 may be calculated by adding a pivot value 913 of the data block 510 to the accumulated pivot value 1133 of the data block 530.

The data block 540 is a data block adjacent in an x-axis direction to the data block 530. Therefore, the accumulated pivot value 1143 of the data block 540 may be calculated by adding a pivot value 943 of the data block 540 to the accumulated pivot value 1133 of the data block 530.

Lastly, the data block 520 is a data block adjacent to the data block 540 in a y-axis direction and adjacent to the data block 510 in an x-axis direction. The pivot value 1123 of the data block 520 may be found by subtracting the pivot value 1133 of the data block 530 from the value obtained by adding the pivot value 1113 of the data block 510 to the pivot value 1143 of the data block 540.

The pivot values 1113, 1123, 1133, and 1143 on which the prefix sum operation has been performed as described above become intermediate values of the propagation.

In at least one example embodiment, the data processing device 200 performs a prefix sum operation in a vertical direction again on the pivot values 1113 and 1133 on which a prefix sum operation has been performed, and row sums on which a prefix sum operation has been performed in a vertical direction. In other words, the data processing device 200 performs a prefix sum operation in a vertical direction together with row sums of the divided data blocks and pivot values located before a corresponding data block.

Referring to FIGS. 10 and 11, a prefix sum operation is performed on the row sum 1011 of the data block 510 and the pivot value 1133 located before the data block 510, that is, the pivot value 1133 of the data block 530, and thus, an accumulated row sum 1111 may be calculated.

A prefix sum operation is performed on the column sum 1042 of the data block 540 and the pivot value 1133 located before the data block 510, that is, the pivot value 1133 of the data block 530, and thus, an accumulated column sum 1142 may be calculated.

Since there is no pivot value located before the data block 530, it is possible to calculate an accumulated rows sum 1131 and an accumulated column sum 1132 by performing a prefix sum operation only on the row sum 1031 and the column sum 1032.

In a case of the data block 520, a prefix sum operation is performed on the column sum 1022 together with the pivot value 1113 of the data block 510 adjacent in an x-axis direction, and a prefix sum operation is performed on the row sum 1021 together with the pivot value 1143 of the data block 540 adjacent in a y-axis direction. Thus, an accumulated row sum 1121 and an accumulated column sum 1122 may be calculated.

A core, which has performed the propagation as described above, stores a row sum and a column sum, on which propagation has been performed, in a shared memory. The data processing device 200 may control the core such that the row sum and the column sum, on which propagation has been performed, stored in the shared memory are copied and stored in the global memory 210 of the data processing device 200.

According to at least one example embodiment, the data processing device 200 copies and stores a row sum and a column sum of each partial SAT stored in the global memory 210 in a shared memory of a core on which propagation is to be performed, and controls the corresponding core such that propagation is performed. Row sums and column sums of the entire SAT can be known without generating the entire SAT through the propagation.

However, the propagation described with reference to FIGS. 10 and 11 is only an example, and it is also possible to perform the propagation in other ways. For example, instead of a prefix sum operation being performed on pivot values separately, a prefix sum operation is performed in a vertical direction for each partial SAT on row sums on which a prefix sum operation has been performed in a horizontal direction to calculate an accumulated pivot value, etc.

Referring again to FIG. 4, in operation 430, when a process of utilizing an SAT is executed, the data processing device 200 completes at least a partial area of the SAT desired and/or necessary for the process based on the at least one partial SAT and the row sums and column sums on which the propagation has been performed. A core performing the process may complete at least a partial area of the SAT desired and/or necessary for the process based on a partial SAT stored in a shared memory, and a row sum, a column sum, and a pivot value on which propagation has been performed.

In at least one example embodiment, when a process utilizing an SAT is executed, the data processing device 200 may load a partial SAT, and a row sum and a column sum on which propagation has been performed that are stored in the global memory 210, and may copy and store them in a shared memory of a core on which the process is performed. Furthermore, the core may complete at least a partial area of a required SAT and store it in the shared memory. This will be described with reference to FIGS. 12 and 13.

Figures 12, 13:
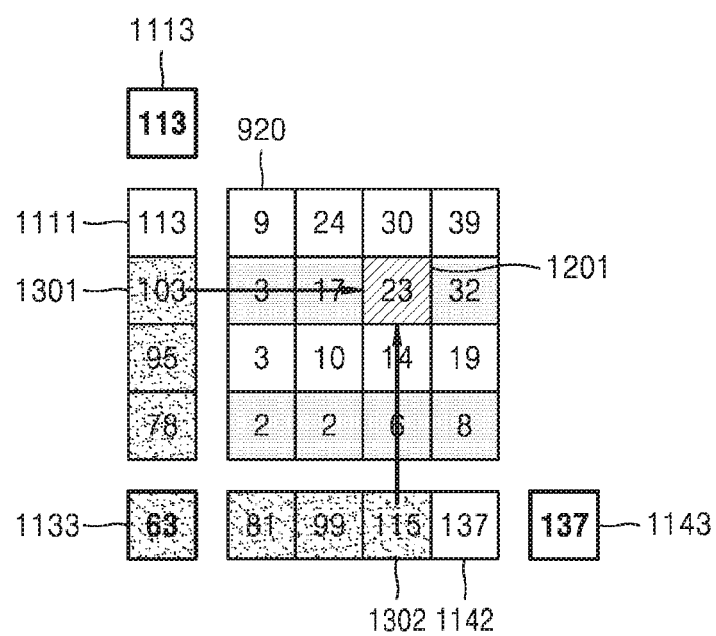
FIG. 12 is a view illustrating a location of data required in a process utilizing an SAT in at least one example embodiment.
FIG. 13 is a view illustrating a process of completing at least a partial area of an SAT including the location of FIG. 12 according to at least one example embodiment.

FIG. 12 is a view illustrating a location of data required in a process utilizing an SAT in at least one example embodiment, and FIG. 13 is a view illustrating a process of completing at least a partial area of an SAT including the location of FIG. 12 according to at least one example embodiment.

In FIG. 12, it is assumed that a process utilizing an SAT desires and/or requires data at an indicated position 1201.

Referring to FIG. 13, the data processing device 200 may calculate a data value of the indicated location 1201 based on the partial SAT 920 including the indicated position 1201 of the partial SATs stored in the global memory 210, and the row sum 1111, the column sum 1142 and the pivot value 1133 on which propagation has been performed until the partial SAT 920.

In more detail, the data value of the indicated position 1201 may be obtained by subtracting 63, which is the pivot value 1133, from a value obtained by adding 103, which is the same column value as the indicated position 1201 among the row sum 1111 on which propagation has been performed, 115, which is the same row value as the indicated position 1201 among the column sum 1141 on which propagation has been performed, and 23, which is a data value of the indicated position 1201 in the partial SAT 920.

$$103+115+23-63=178$$

In other words, the data value of the indicated position 1201 in the SAT becomes 178. The calculated data may be stored in the shared memory of the core on which the calculation has been performed and used to perform the process. This process may be repeated for each cell of the data block.

According to at least one example embodiment, as described above, it is possible to obtain desired and/or necessary data with the partial SAT 920 instead of the entire SAT, the row sum 1011, the column sum 1042, and the pivot values 1033 on which the propagation has been performed until the partial SAT 920, and thus, the number of memory accesses and an operation time of the global memory 210 having a slow and/or slower processing speed may be reduced, thereby increasing the processing speed and decreasing the total processing time of the entire process.

Referring again to FIG. 4, in operation 440, the data processing device 200 progresses the process using a completed partial area.

As described above, the data processing device 200 performs the operations 410 and 420 to store the partial SATs 910, 920, 930 and 940, the row sums 1111, 1121, 1131 and 1141 on which propagation has been performed, and the column sums 1112, 1122, 1132, and 1142 on which propagation has been performed in the global memory 210. In other words, partial SATs instead of completed SAT, column sums, row sums, and pivot values are stored in the global memory 210. Next, when a process requiring an SAT is executed in operations 430 and 440, the data processing device 200 combines the values stored in the global memory 210 to complete at least a partial area of the SAT necessary for the process, and may perform the process by using the completed partial area. In at least one example embodiment, the process may be an image processing function such as an image blurring, filtering, and the like, but the example embodiments are not limited thereto.

According to at least one example embodiment, the data processing device 200 may store partial SATs instead of a completed SAT, and a row sum, a column sum and a pivot value in the global memory 210, and may use them in combination when needed. As a result, the data processing device 200 may reduce the number of memory accesses and an operation time with respect to the global memory 210 having a slow processing speed, thereby increasing a processing speed.

The data values used in FIGS. 5 through 13 are merely examples for explaining various example embodiments of the inventive concepts, and the data values may vary depending on data to be used.

The device described herein may comprise at least one processor, a memory for storing program data and executing it, a permanent locker unit such as a disk drive, a communication port for handling communications with external devices, and user interface devices including a touch panel, keys, buttons, etc. When software modules or algorithms are involved, these software modules may be stored as program codes and/or computer-readable instructions executable on at least one processor on a non-transitory computer-readable recording medium. Examples of the non-transitory computer-readable recording medium include magnetic storage media (e.g., ROM, RAM, floppy disks, hard disks, etc.), and optical recording media (e.g., CD-ROMs, digital versatile disks (DVDs), etc.). The non-transitory computer-readable recording medium can also be distributed over network-coupled computer systems so that the computer-readable instruction is stored and executed in a distributive manner. This media can be read by the computer, stored in the memory, and executed by the processor.

Various example embodiments of the inventive concepts may be illustrated by functional block formations and various processing operations. Such functional blocks may be realized by a multiple number of hardware configurations performing particular functions or combinations of hardware and software configurations. For example, some example embodiments may adopt IC formations such as memory, processors, logic units and look-up tables, which can perform various functions by controlling more than one microprocessor or by other control systems. Similarly to formation elements being capable of being executable by software programming or software factors, the present disclosure may be realized by programming or scripting languages such as C, C++, Java and assembler, including various algorithms realized by a combination of data structures, processes, routines or other programming formations executed by hardware components. Functional aspects may be realized by algorithms executed in more than one processor. Functional aspects may be realized by algorithms executed in more than one processor. In addition, the present disclosure may adopt related-art technology for electronic environment set-up, signal processing, and/or data processing, etc. Terms such as "mechanism", "element", "means" and "formation" may be widely used, and not limited to mechanical and physical formations. Terms above may include meanings of series of routines of software related to a processor, etc.

The particular implementations shown and described herein are illustrative example embodiments of the inventive concepts and are not intended to otherwise limit the scope of the inventive concepts in any way. For the sake of brevity, conventional electronics, control systems, software development and other functional aspects of the systems may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

The use of the terms "a", "an", and "the" and similar referents in the context of describing the inventive concepts (especially in the context of the following claims) are to be construed to cover both the singular and the plural. Furthermore, the recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concepts are not limited to the described order of the steps. The use of any and all examples, or example language (e.g., "such as") provided herein, is intended merely to better illuminate the inventive concepts and does not pose a limitation on the scope of the inventive concepts unless otherwise claimed. Numerous modifications and adaptations will be readily apparent to one of ordinary skill in the art without departing from the spirit and scope of the inventive concepts.

It should be understood that various example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A method of processing data using a summed area table (SAT), the method comprising:
generating, using at least one processor, at least one partial SAT from a SAT, the generating including dividing data of the SAT stored in a global memory into a plurality of divided data blocks, and obtaining an obtained row sum of each row and an obtained column sum of each column of at least one divided data block of the plurality of divided data blocks, the at least one partial SAT being a subset of the SAT and corresponding to at least one divided data block of the plurality of divided data blocks;
performing propagation, using the at least one processor, on the obtained row sums and the obtained column sums;
when a process of utilizing the SAT is executed, completing, using the at least one processor, at least one partial area of the SAT based on the at least one partial SAT corresponding to the at least one partial area of the SAT and the obtained row sums and the obtained column sums on which the propagation has been performed; and
performing the process using the completed at least one partial area of the SAT,
wherein the performing propagation on the obtained row sums and the obtained column sums further includes,
performing a prefix sum operation in a horizontal direction on the obtained row sums,
performing a prefix sum operation in a vertical direction on the obtained column sums, and
performing propagation based on the obtained row sums on which the prefix sum operation has been performed in the horizontal direction and the obtained column sums on which the prefix sum operation has been performed in the vertical direction.

2. The method of claim 1, wherein the generating the at least one partial SAT comprises:
performing a prefix sum operation in a horizontal direction for each row in at least one divided data block of the plurality of divided data blocks; and
performing a prefix sum operation in a vertical direction for each column in the at least one divided data block.

3. The method of claim 1, wherein the performing propagation based on the obtained row sums on which the prefix sum operation has been performed in the horizontal direction and the obtained column sums on which the prefix sum operation has been performed in the vertical direction comprises:
performing a prefix sum operation in at least a horizontal direction and a vertical direction for at least one pivot value of the at least one partial SAT;
performing a prefix sum operation in a vertical direction for the at least one partial SAT for the obtained row sums on which the prefix sum operation has been performed in the horizontal direction;
performing a prefix sum operation in a horizontal direction for the at least one partial SAT for the obtained column sums on which the prefix sum operation has been performed in the vertical direction;
applying the pivot values to the obtained row sums on which the prefix sum operation has been performed in the vertical direction and the obtained column sums on which the prefix sum operation has been performed in the horizontal direction; and
calculating accumulated row sums and column sums based on results of the applying the pivot values to the obtained row sums and the obtained column sums.

4. The method of claim 3, wherein the completing the at least a partial area of the SAT comprises:
completing the partial area of the SAT based on the at least one partial SAT, the at least one partial SAT including desired data, the obtained row sums, the obtained column sums, and the pivot values on which the propagation has been performed.

5. The method of claim 4, wherein the completing the at least a partial area of the SAT comprises:
adding a data value of a cell where the desired data is located in the at least one partial SAT, a row sum located in a same column as a location of the desired data, and a column sum located in a same row as a location of the desired data; and
subtracting the pivot values from a value obtained by the adding.

6. The method of claim 1, wherein the generating the at least one partial SAT comprises:
determining a number of data blocks to create from the data stored in the global memory based on a number of processor cores used to process the plurality of divided data blocks.

7. A data processing device for using a summed area table (SAT) comprising:
a plurality of processor cores;
a global memory connected to the plurality of processor cores; and
a controller configured to,
generate at least one partial SAT from a SAT, the generating of the at least one partial SAT including dividing data of the SAT stored in the global memory into a plurality of data blocks, the at least one partial SAT being a subset of the SAT and corresponding to at least one of the plurality of data blocks,
obtain an obtained row sum of each row and an obtained column sum of each column of the at least one partial SAT,
perform a prefix sum operation in a horizontal direction on the obtained row sums, and
perform a prefix sum operation in a vertical direction on the obtained column sums, and
perform propagation based on the obtained row sums on which the prefix sum operation has been performed in the horizontal direction and the obtained column sums on which the prefix sum operation has been performed in the vertical direction in response to a process of utilizing the SAT being executed,
complete at least one partial area of the SAT based on the at least one partial SAT corresponding to the at least one partial area of the SAT and the obtained row sums and the obtained column sums on which the propagation has been performed, and
control the plurality of processor cores and the global memory to perform the process based on the completed at least one partial area of the SAT.

8. The data processing device of claim 7, wherein each of the plurality of processor cores comprises:
a plurality of functional blocks, each of the plurality of functional blocks configured to process threads related to the process; and a shared memory connected to the plurality of functional blocks and configured to store data related to the threads.

9. The data processing device of claim 8, wherein the controller is configured to control the plurality of processor cores and the global memory to:
store a data block of the data blocks in the shared memory;
perform the prefix sum operation in the horizontal direction on the obtained row sums by performing a prefix sum operation in a horizontal direction for each row of the stored data block using the plurality of functional blocks;
perform the prefix sum operation in the vertical direction on the obtained column sums by performing a prefix sum operation in a vertical direction for each column of the stored data block using the plurality of functional blocks; and
store results of the prefix sum operation in the horizontal direction and results of the prefix sum operation in the vertical direction in the global memory.

10. The data processing device of claim 8, wherein the controller is configured to control the plurality of processor cores and the global memory to:
store the obtained row sums and the obtained column sums read from the global memory in the shared memory;
perform the prefix sum operation in the horizontal direction by using the plurality of functional blocks on the obtained row sums stored in the shared memory;
perform the prefix sum operation in the vertical direction on the obtained column sums by using the plurality of functional blocks on the obtained column sums stored in the shared memory;
perform propagation based on the obtained row sums on which the prefix sum operation has been performed in the horizontal direction and the obtained column sums on which the prefix sum operation has been performed in the vertical direction; and
store results of the performed propagation in the global memory.

11. The data processing device of claim 10, wherein the controller is configured to control at least one processor core of the plurality of processor cores to:
perform a prefix sum operation in a horizontal direction and a vertical direction for pivot values of the at least one partial SAT;
perform a prefix sum operation in a vertical direction for each partial SAT for the obtained row sums on which the prefix sum operation has been performed in the horizontal direction;
perform a prefix sum operation in a horizontal direction for each partial SAT for the obtained column sums on which the prefix sum operation has been performed in the vertical direction;
apply the pivot values to the obtained row sums on which a prefix sum operation has been performed in the vertical direction and the obtained column sums on which a prefix sum operation has been performed in the horizontal direction;
calculate accumulated row sums and column sums based on results of the applying the pivot values to the obtained row sums and the obtained column sums; and
control the at least one processor core of the plurality of processor cores to store the accumulated row sums and the accumulated column sums in the global memory.

12. The data processing device of claim 11, wherein the controller is configured to control the at least one processor core to:
store the partial SAT, the partial SAT including desired data read from the global memory, the row sums, the column sums, and the pivot values on which the propagation has been performed, in the shared memory of each of the at least one processor core of the plurality of processor cores; and
complete the partial area of the SAT based on the partial SAT including the desired data, the obtained row sums, the obtained column sums and the pivot values on which the propagation has been performed, using the plurality of functional blocks.

13. A method of processing image data using a summed area table (SAT), the method comprising:
determining, using at least one controller, a number of processors included in a data processing device, the data processing device including a plurality of processors;
dividing, using the at least one controller, an input image data set into a plurality of sub-data blocks based on the number of processors, the input image data set and the sub-data blocks being in a matrix format, the input image data set corresponding to a SAT;
generating, using the at least one controller, a plurality of partial SATs from the SAT based on the plurality of sub-data blocks, each of the plurality of partial SATs being a subset of the SAT, the generating including,
obtaining a row sum of each row and a column sum of each column of each of the plurality of partial SATs,
performing a prefix sum operation in a horizontal direction on the obtained row sums,
performing a prefix sum operation in a vertical direction on the obtained column sums, and
performing propagation based on the obtained row sums on which the prefix sum operation has been performed in the horizontal direction and the obtained column sums on which the prefix sum operation has been performed in the vertical direction;
allocating, using the at least one controller, each of the plurality of partial SATs to one of the plurality of processors for processing; and
controlling, using the at least one controller, each of the plurality of processors to process the plurality of partial SATs in accordance with a desired image processing function in parallel.

14. The method of claim 13, wherein the generating the plurality of partial SATs includes:
calculating the row sum associated with each of the plurality of partial SATs by performing a prefix sum operation in a horizontal direction for each row of each of the plurality of partial SATs; and
calculating the column sum associated with each of the plurality of partial SATs by performing a prefix sum operation in a vertical direction for each column of each of the plurality of partial SATs.

15. The method of claim 14, wherein the controlling each of the plurality of processors includes controlling each of the plurality of processors to:
generate a region of the SAT based on the partial SAT, the row sum, and the column sum; and
store the region of the SAT in a global memory associated with the data processing device.

* * * * *